Oct. 23, 1923.  
O. R. FULLER  
AUTO WHEEL  
Filed Dec. 22, 1920  
1,471,786  
2 Sheets-Sheet 1

INVENTOR  
Olive R. Fuller.  
By Hazard & Miller  
ATTYS.

Oct. 23, 1923.
O. R. FULLER
AUTO WHEEL
Filed Dec. 22, 1920
1,471,786
2 Sheets-Sheet 2
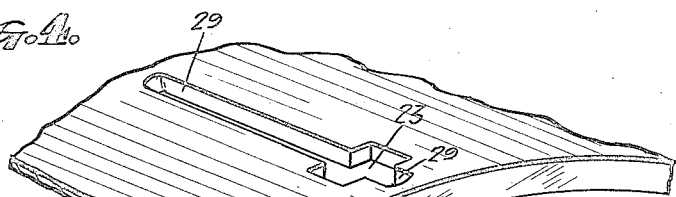
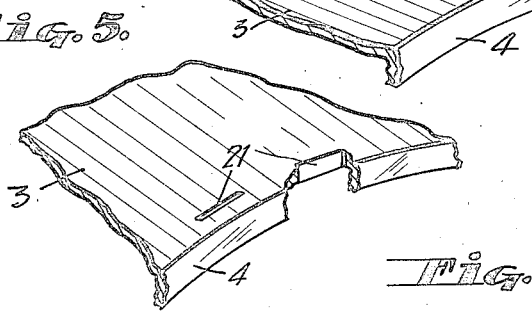
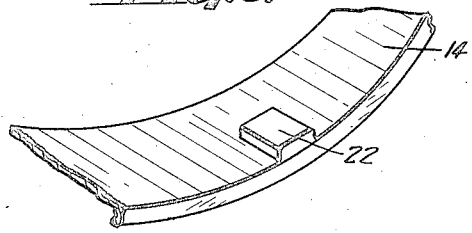
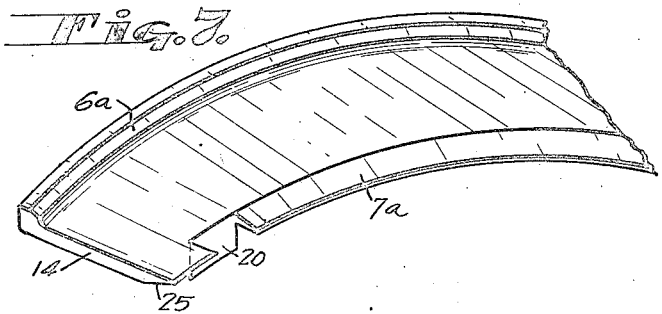
INVENTOR
Olive R. Fuller
By Hazard Miller
ATTYS.

Patented Oct. 23, 1923.

1,471,786

UNITED STATES PATENT OFFICE.

OLIVE R. FULLER, OF LOS ANGELES, CALIFORNIA.

AUTO WHEEL.

Application filed December 22, 1920. Serial No. 432,609.

*To all whom it may concern:*

Be it known that I, OLIVE R. FULLER, a citizen of the United States, residing at Los Angeles, in the county of Los Angeles and State of California, have invented new and useful Improvements in Auto Wheels, of which the following is a specification.

It is the object of this invention to provide a wheel for automobiles and the like having improved means, whereby two usual pneumatic tires mounted upon usual demountable rims may be positioned upon the wheel, so as to positively retain the tires upon the wheel in proper alinement.

It is a further object of the invention to provide a construction wherein the tires may be readily removed from the rim of the wheel.

The invention will be readily understood from the following description of the accompanying drawings, in which:

Figure 1 is a side elevation of a wheel constructed in accordance with the invention.

Figs. 2 and 3 are transverse sections on the lines 2—2 and 3—3 of Fig. 1.

Fig. 4 is a perspective view of a portion of the wheel rim at the line 2—2 of Fig. 1.

Fig. 5 is a similar view of a portion of the wheel rim at the line 3—3 of Fig. 1.

Fig. 6 is a similar view of a portion of the removable rim employed for retaining the outside wheel in position, at the line 2—2 of Fig. 1.

Fig. 7 is a similar view of a portion of this rim at the line 3—3 of Fig. 1.

Figure 1:
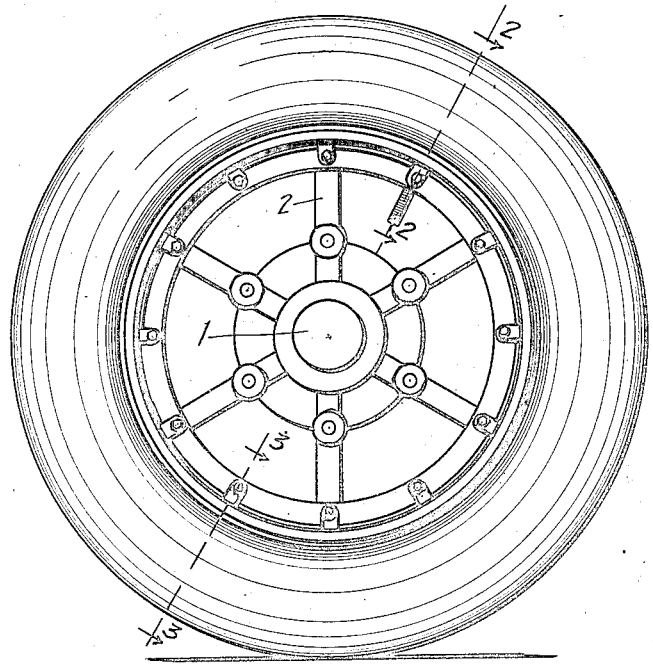
Figure 2:
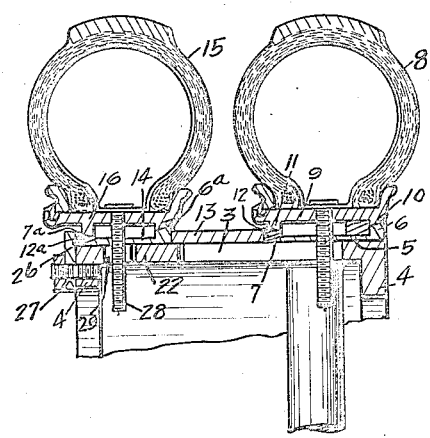
Figure 3:
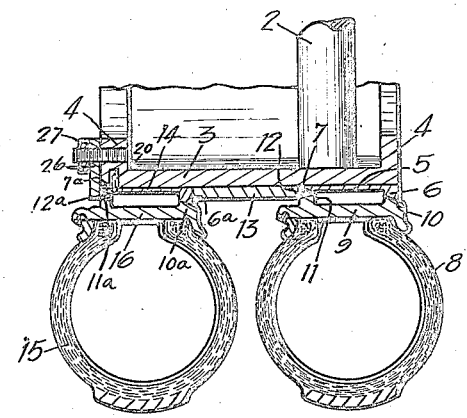

In the drawings I have illustrated a wheel construction which includes hub 1, spokes 2 and an annular fixed rim 3, preferably having inwardly extending edge flanges 4. This annular rim is of sufficient width, so that two usual pneumatic tires and their demountable rims may be mounted thereon.

At the inner edge of rim 3 a split ring 5 is mounted upon rim 3, and is fixed against movement in any suitable manner. The inner edge of this ring is provided with an outwardly projecting annular bead 6 having a beveled surface, and the outer edge of the ring is preferably beveled as shown at 7.

The ring 5 as thus constructed is of the usual design adapted to have a tire and its demountable rim mounted thereon.

The usual pneumatic tire is shown at 8 mounted upon a usual demountable rim 9, which is provided with usual ribs 10 and 11 cooperating with bead 6 and beveled edge 7, in usual manner. The tire and its demountable rim are held in position by the usual annular wedge-shaped member 12 received between rib 11 and the beveled edge 7 of ring 5.

A spacing ring 13 is received upon rim 3 beyond ring 5 and the tire mounted thereon, said ring fitting snugly upon rim 3 and abutting at one edge against the wedging ring 12 for retaining the latter in position, and thereby hold the tire 8 upon the wheel and in proper alinement.

Beyond ring 13 a removable wedge ring 14 is received upon rim 3, and the second tire 15 and its demountable rim 16 are mounted upon this ring.

The wedge ring 14 at its inner edge is provided with a beveled beading $6^a$, and its outer edge is beveled as shown at $7^a$. The demountable rim 16 is of usual construction having the inner rib $10^a$ received upon beading $6^a$, and the outer rib $11^a$ cooperating with beveled edge $7^a$ to provide an annular recess in which is received a usual wedging ring $12^a$.

The ring 14 is removably mounted upon rim 3, and is held thereto at diametrically opposite points by means positioned at the inner and outer edges of ring 14 respectively, so that the ring 14 will be positively positioned with relation to rim 3 and in proper alinement thereon.

As an instance of this arrangement ring 14 is shown as a split ring having inwardly extending tongues 20 depending from beveled edge $7^a$ adjacent the respective ends of the split ring. The rim 3 is provided with slots 21 adapted to receive tongues 20 for retaining the ends of the split ring with relation to rim 3. At a diametrically opposite point the under surface of ring 14 at the inner edge thereof is provided with a lug 22, which is received in an opening 23 provided in rim 3, so as to hold ring 14 with relation to rim 3 at this point.

It will thus be seen that I have provided a construction for ring 14, whereby it may be readily placed in position upon rim 3 and held thereon by tongues 20 received in slots 21, and lug 22 received in opening 23. Ring 14 is thus held against circumferential movement upon rim 3 in proper alinement upon the same. Through its abutment against spacing ring 13, it will also hold the latter against wedging ring 7, so as to retain the inner tire 8 in proper position upon the wheel.

The wedging ring 12ª in addition to retaining demountable rim 16 upon ring 14, will also positively retain ring 14 in position, but by removing this wedging ring, both demountable rim 16 and the ring 14 are readily removable. In order to remove ring 14, it is necessary to pry up the ends of the same, so as to disengage lips 20 from slots 21, and in order that this may be readily accomplished, the under surface of the inner edge of the ring 14 at its ends is preferably undercut as shown at 25 in order that a suitable tool may be inserted. The wedging ring 12ª is positively held in position in order to lock both tires upon the wheel by means of the usual lugs 26 bolted to the rim 3 as shown at 27, and having their ends engaging the wedging rim.

The valve stems for the tires are shown at 28 as received in slot 29 extending through rim 3 at the opening 23, so as to project beyond opposite sides of said opening. By this arrangement when removing the tires after wedging ring 12ª has been removed, tire 15 and its demountable rim may be removed in usual manner by first slipping the demountable rim from ring 14 at a part opposite the valve stem, and then lifting the tire from ring 14, so that its valve stem comes out through slot 29. Ring 14 is then removed and the spacing ring 13 is slipped from rim 3. This releases the wedging ring 7, so that it may be readily removed, and tire 8 and its demountable rim 9 are then shifted laterally upon rim 3 with the valve stem of tire 8 sliding along slot 29. When the tire is adjacent the outer edge of rim 3, it may be removed therefrom in the same manner as described for tire 15 and its rim 16.

It will thus be seen that I have provided a construction whereby a plurality of tires mounted upon demountable rims may be readily positioned upon the rim of a wheel, the tires being positively held in position and in proper alinement, and being readily removable from and demountable upon the rim of the wheel.

Various changes may be made without departing from the spirit of the invention as claimed.

What is claimed is:

1. In combination, a wheel rim, a ring on the wheel rim having a beveled outer edge and a beaded inner edge which is beveled to provide a face in parallelism with the outer edge, a demountable tire carrying rim embracing the ring and having beveled ribs one of which contacts with one edge of the ring, and a wedge ring interposed between the other beveled rib and ring edge for locking the demountable rim against lateral displacement from the ring.

2. In combination, a wheel rim, a ring removably mounted on the wheel rim, and co-acting means at spaced points on the rim and ring for securing the ring in a predetermined and alined position on the rim, said means comprising lugs and tongues formed on the second rim, slots and openings in the wheel rim and adapted to receive said tongues and lugs, respectively.

3. In combination, a wheel rim, a split ring removably mounted on the wheel rim, lugs and tongues formed on the ring, slots and openings formed in the wheel rim and adapted to receive said tongues and lugs, respectively, the ring having an undercut portion to allow of the prying up of the ends of said rim, and the rim being formed with a slot adapted to receive the valve stem of a tire, in the manner and for the purpose described.

4. In combination, a wheel rim, a split ring removably mounted on the wheel rim and having a beveled outer edge and a beaded inner edge, a demountable tire carrying rim embracing the ring and having a rib contacting with one edge of the split ring, and a wedge ring interposed between the beveled edge and the rib for the purpose described.

5. In combination, a wheel rim, a ring removably mounted on the wheel rim, coacting means on the rim and ring for securing the ring in a predetermined position on the rim, said means comprising lugs and tongues formed on the ring and slots and openings in the wheel rim, said ring having a beveled outer edge and a beaded inner edge, a demountable tire carrying rim embracing the ring and having ribs one of which contacts with one edge of the ring, and a wedge ring interposed between the other beveled rib and ring edge for the purpose described.

In testimony whereof I have signed my name to this specification.

OLIVE R. FULLER.